D. W. C. Sanford.
Refrigerator.

No. 455. Reissued Apr. 21. 1857.

UNITED STATES PATENT OFFICE.

D. W. C. SANFORD, OF ST. LOUIS, MISSOURI.

IMPROVEMENT IN REFRIGERATORS.

Specification forming part of Letters Patent No. 13,802, dated November 13, 1855; Reissue No. 455, dated April 21, 1857.

*To all whom it may concern:*

Be it known that I, D. W. C. SANFORD, of St. Louis, in the county of St. Louis and State of Missouri, have invented an Improvement in Refrigerators; and I do hereby declare that the following is a full, clear, and exact description of the principle or character which distinguishes it from all other things before known, and of the usual manner of making, modifying, and using the same, reference being had to the accompanying drawings, of which—

Figure 1:
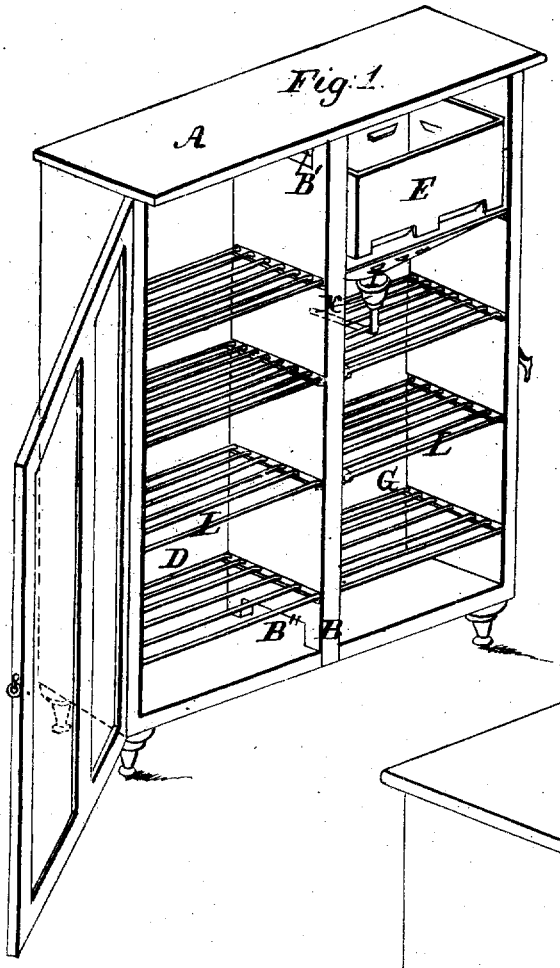
Figure 2:
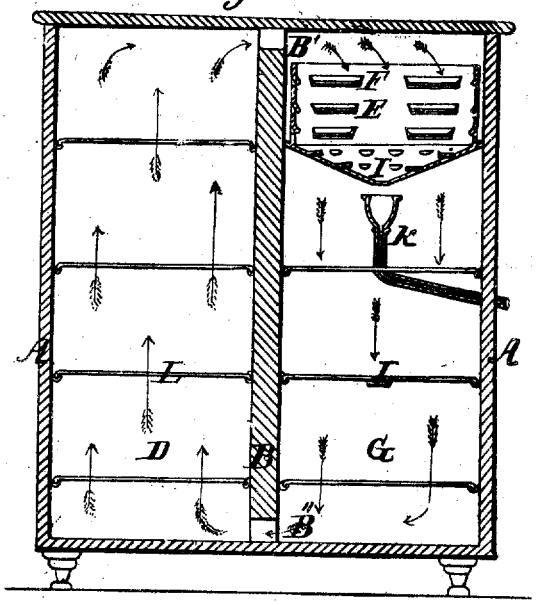

Figure 1 is a perspective view exhibiting the interior of the refrigerator; Fig. 2, a vertical middle section, and Fig. 3 a perspective of a smaller-sized refrigerator with one of the apartments contracted.

My invention consists in an improvement in refrigerators, whereby the whole of the contained air is kept in continual rotation, purification, desiccation, and refrigeration, and with economy of ice.

The circulation of the air of my refrigerator is entirely confined, and consists of a continuous movement or rotation of the air confined within the apartment without any communication with the external air except when it becomes unavoidable from opening the refrigerator. I have found for purification that external air is not necessary, and it is obvious that any arrangement by which a current of external air after being cooled is passed through the refrigerator must be attended with a great consumption of ice, and that any arrangement which admits of stagnation of air in any part of the refrigerator, and does not compel circulation of the air throughout the entire apartments, is highly objectionable. Both of these conditions I have avoided, as will be seen from the following description:

Fig. 1 exhibits clearly the arrangement of the interior of my refrigerator. Within a suitable casing, A, I insert a partition, B, with openings B′ B″, at top and bottom, so that there is free communication between the apartments C and D. At a high point in one of the apartments I place the ice-receptacle E. This receptacle is perforated on the sides and bottom, so as to allow free passage of air through and in contact with the ice. The ice is prevented from coming into contact with the sides of the receptacle by the projections F F, which in this case are made by punching the holes in such a way that a portion of the metal is protruded, as seen at F F. The bottom of the ice-receptacle is funnel-shaped, so as to conduct the water of the melting ice to a central discharge, I, whence it falls into the cup or flaring end of the escape-pipe K. This pipe passes directly out through the side of the refrigerator, and it is important that the escape-pipe should occupy as little room possible in order not to obstruct the motion of the air. The shelves L are perforated to allow of the free transit of air, and it will now be readily seen that when the ice is placed in its receptacle and the refrigerator closed, the whole of the contained air will be set in motion and continue to circulate or revolve as long as there is any ice or refrigerating material in the receptacle.

The operation is as follows: The denser air in contact with the ice and walls of the receptacle descends and its place is immediately supplied by warmer air from apartment D through the opening B′. The dense air descending through the entire apartment C and passing through the opening $B^2$ keeps up a continual displacement of the whole of the contained air of the refrigerator. The apartment D has a higher temperature than apartment C, and the temperature varies with a gradual rise from the time the air leaves the receptacle until it arrives at the upper part of apartment D. It is evident that the rotation of the air will continue until the ice is melted, and an equilibrium of temperature takes place throughout the entire refrigerator. As the air passes through the apartments it imbibes moisture from fruits, vegetables, meats, and other articles, and when it comes into contact with the ice its capacity for moisture is diminished by condensation and the moisture is condensed upon the ice and passes off with the waste water. The circulating air thus being continually desiccated every part of the apartments is kept from mold and dampness. The exhalations and odor of meats and other articles are also precipitated upon the ice with the condensed vapor, and thus the entire apartments are kept sweet.

It is well known that mold will not generate in a current of air, and it is known that when once formed it propagates itself and spreads with rapidity; therefore, if any one part of the refrigerator be out of the direct course of circulation the air will stagnate there and develope mold, which will contaminate the whole apartment.

Figure 3:
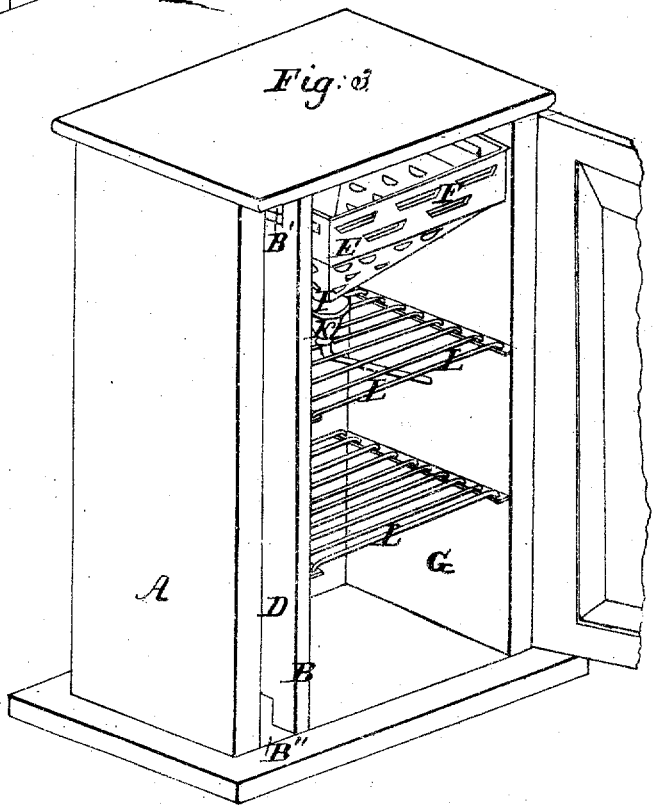

The apartment D may vary in width, and it may be, as shown in Fig. 3, so narrow as to serve merely as a passage for the ascending current of air, the greatest benefit being always derived from the downward current in apartment C.

I am aware that various devices have long since been known for causing the internal circulation of air in apartments of houses and refrigerators; but I am not aware that in any instance a complete and continued rotation, purification, desiccation, and refrigeration of the whole of the contained air of a refrigerator has been compelled under the same arrangement as in my improvement; therefore,

What I claim as my improvement in refrigerators is—

1. The employment of an open-bottom ice-box, or equivalent thereof, in combination with a dividing-partition open above and below, so placed that by means of self-operating internal circulation the whole of the contained air shall be kept in motion and caused to revolve around this partition in currents moving downward only on one side of this partition and upward only on the other side, when the same is combined with a chamber for the refrigeration of food or provisions placed directly under said ice-box, as set forth.

2. I do not claim by itself a partition dividing vertically one compartment of a refrigerator from another; nor do I claim placing articles to be refrigerated in a descending current of air; but I do claim placing shelves or fixtures for holding articles to be refrigerated, or the articles themselves, in the descending current directly under an open-bottom ice-box, in combination with a dividing-partition open above and below, as set forth.

3. In combination with said shelves or fixtures so placed, constructing the open bottom of the ice-box in such manner that the air may pass freely down through the same and fall directly from the ice upon the articles to be refrigerated, while at the same time the drip of the water is prevented, as set forth.

D. W. C. SANFORD.

Witnesses:

CHAS. G. PAGE,

R. T. CAMPBELL.